Jan. 9, 1973    F. H. HAMMOND, JR    3,709,808
PROCESS FOR THE ELECTRODEPOSITION OF POLYMERS
Filed April 27, 1970    2 Sheets-Sheet 1

United States Patent Office 3,709,808
Patented Jan. 9, 1973

3,709,808
PROCESS FOR THE ELECTRODEPOSITION
OF POLYMERS
Fred H. Hammond, Jr., Wellesley, Mass., assignor to The
Kendall Company, Boston, Mass.
Filed Apr. 27, 1970, Ser. No. 32,106
Int. Cl. B01k 5/02
U.S. Cl. 204—181                                       4 Claims

ABSTRACT OF THE DISCLOSURE

Self-sustaining polymeric films of low conductivity and low water content are continuously formed by an electrodeposition process in which the migrating particles are caused to coalesce on a water-bearing layer placed between a bath of suspended charged polymer particles and a rotating cylindrical electrode bearing a charge opposite to the charge on the particles.

---

This invention relates to the continuous formation of certain self-sustaining polymeric films by means of an electrodeposition process. More particularly, it relates to an electrodeposition process for polymeric materials wherein a water-bearing barrier layer is constantly maintained on a moving electrode, whereby adhesive contact between the coalescing polymeric particles and the electrode is prevented.

The formation of polymeric coatings by electrodeposition onto a substrate is well known, and has been applied to the art of coating articles with natural or synthetic elastomeric polymers, paint, wax and the like. The migrating particles may be deposited directly as an adherent coating on a charged metallic object such as a part of an automobile body, or a porous object such as a fabric may be interposed between a charged electrode and the bath, to cause an adherent coating of polymer to be deposited on the cloth.

It is also known to deposit a self-sustaining strippable polymeric film onto a charged electrode, but such a process is feasible only when the polymeric film has a conductance, expressed in micro mhos, above a certain level, as explained more fully below. Two classes of polymeric deposits are therefore recognized: those which due to high water content, or for other reasons, are considered conductive in an electrodeposition process, and those whose conductivity is lower than a certain critical level. The conductive polymers tend to form thick films, since the attraction of the polymer particles to the electrode continues even after the initial film has been deposited. They are also in general readily stripped from the electrode as an integral film.

Low-conductive polymeric films electrodeposited from polymeric dispersions are generally self-limiting in thickness in that the insulating value of the deposited film increases so that the attraction of the electrode for the polymer particles rapidly decreases.

In general, polymeric films which are readily strippable from an electrode after electrodeposition are characterized by a water content, in the deposited state, of over 50%, and a conductance S of over 15 micro mhos per square centimeter, where conductance is defined as the current in amperes divided by the product of electrode area times the voltage, or $S = I/AV$. Such polymers when electrodeposited from the dispersion state will, if the process is continued, build up films which reach a substantial fraction of an inch in thickness, readily removable from the electrode in the form of an integral film. A prime example of such behavior is rubber latex, which has been reported as having film conductances of from 30 to 1,000 micro mhos per square centimeter, depending on purity.

A specially selected, high-purity, low-ammonia rubber latex as found to have a conductance of 22 micro mhos per square centimeter.

By contrast, polymers which form films which have a water content of less than 20% and a conductance of not more than 10 micro mhos per square centimeter, will deposit on a metallic electrode to form a tenacious deposit, not readily removable without description of the film. Electrodeposited polymeric films with conductances of 10-15 micro mhos per square centimeter are intermediate in behavior, being occasionally removable from a metallic electrode in pieces of substantial area.

It is with the art of continuously removing from an electrode an electrodeposited film with a water content of less than 20% and a conductance of not over 10 micro mhos per square centimeter that the present invention is concerned. It is a primary object of this invention to provide such a process.

Further objects of the invention will appear from the following description and drawings, in which.

Basically, the present invention comprises the customary elements associated with the electrodeposition of polymers from a suspension of charged polymeric particles; a vessel containing a suspension of charged polymeric particles, an anode and cathode, and a source of direct current. One of the electrodes (the anode in the case of polymer particles bearing a negative charge) is made in the form of a rotating cylinder. The migrating polymeric particles are prevented from making adhesive contact with the rotating anode by the interposition, between the anode and the bath, of a continuous water-bearing barrier layer. This layer may be an insoluble but water-swellable film, such as cellophane, cross-linked polyvinyl alcohol, or cross-linked gelatine; or it may be a thin layer of a water-soluble substance such as glycerine, diethylene glycol, or thickened aqueous suspensions of non-ionic protective colloids. Since the use of water-soluble films may eventually lead to contamination of the polymer bath by diffusion of the applied aqueous film, the former method of using a water-saturated but insoluble film is preferred for the continuous formation and removal of polymeric film.

Figure 1:
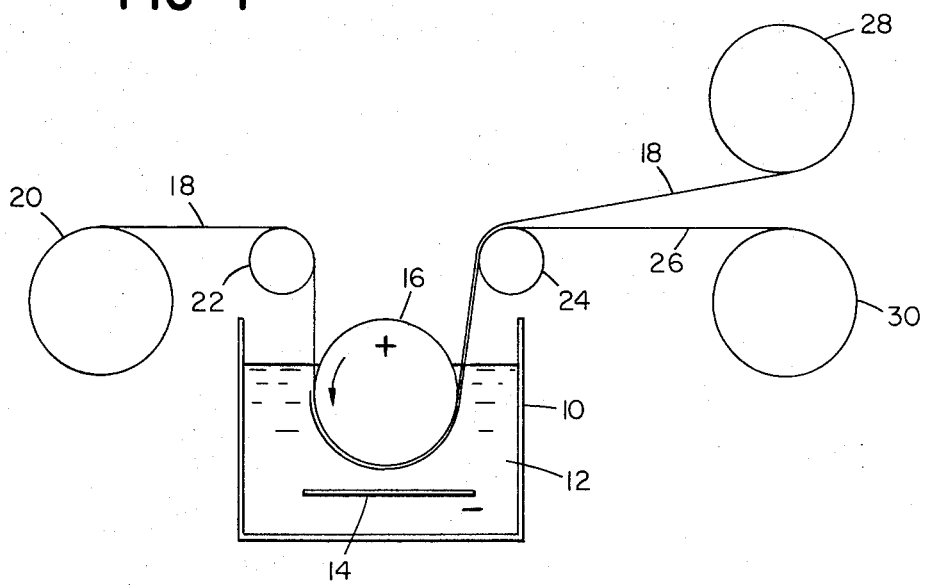
FIG. 1 is a schematic representation of an apparatus suitable for carrying out the process of this invention.

Referring now to FIG. 1, there is shown a suitable container 10, such as a tank, containing a suspension or emulsion 12 of charged polymeric particles. Assuming that the polymeric particles are negatively charged, a cathode 14 and anode 16 are connected to a source of current, not shown, to cause migration of the negatively-charged particles toward the anode. The cathode 14 may be a flat plate, as shown, or may be curved to maintain it equidistant at all points from the cylindrical anode 16, as is known in the art.

The anode 16 is in the form of a hollow or solid metal roll or cylinder, conveniently of graphite, aluminum, zinc, stainless steel, or various other alloys. A positive charge is maintained on the anode by means of a conventional brush and collar arrangement encircling the extended axis of the cylinder, or by means of a roller foot in contact with the cylinder surface. Such devices are well known, and are not shown.

The migrating polymer particles are prevented from making contact with the anode by a sheet of water-bearing film 18, substantially coextensive in width with the width of the rotating cylindrical anode 16. This film, delivered from the supply roll 20 and over guide roll 22, fits snugly against the surface of the anode.

The film 18 may be any of a class of hydrophilic films such as cellophane which has not been wax coated to make it moisture proof and water repellant; polyvinyl alcohol or gelatin which have been cross-linked to the point where they are water-imbibing but not water-soluble; insolubilized polyvinyl pyrrolidone, and the like. Preferably the film is capable of readily absorbing at least its own weight in water, said water being supplied by the aqueous bath of polymer suspension.

The negatively-charged polymer particles, attracted toward the anode 16, are deposited on the film 18. Due to the conductive nature of the wet non-insulating film, the particles lose their charge and coalesce into a unitary, self-sustaining film 26 which may readily be stripped from the cellophane film 18. The electrodeposited film 26 may be wound up into a supply roll 30. If beads of surface water are to be removed, a conventional wiping or surface-suction device, not shown, may be inserted between the point where the polymer film emerges from the bath and the wind-up roll 30. It will be obvious that if the polymer film is to be used in a second operation, such as lamination to a fabric, it may pass directly to such a subsequent process.

The cellophane barrier film 18, after separation from the polymer film 26, may be wound up into a reusable roll 28.

Various modifications are possible in this process of electrodepositing continuous polymeric films on an impervious water-bearing barrier layer of film. For example, instead of the film being supplied by supply roll 20 and wound up in roll 28 as in FIG. 1, the barrier film may be in the form of an endless belt 18 continuously supplied to and removed from the bath by means of guide rolls 21, 22, 24, 27, and 29, as shown in FIG. 2.

Methods of constantly furnishing fresh polymeric suspension as the bath is exhausted are conventional and form no part of this invention.

Figure 2:
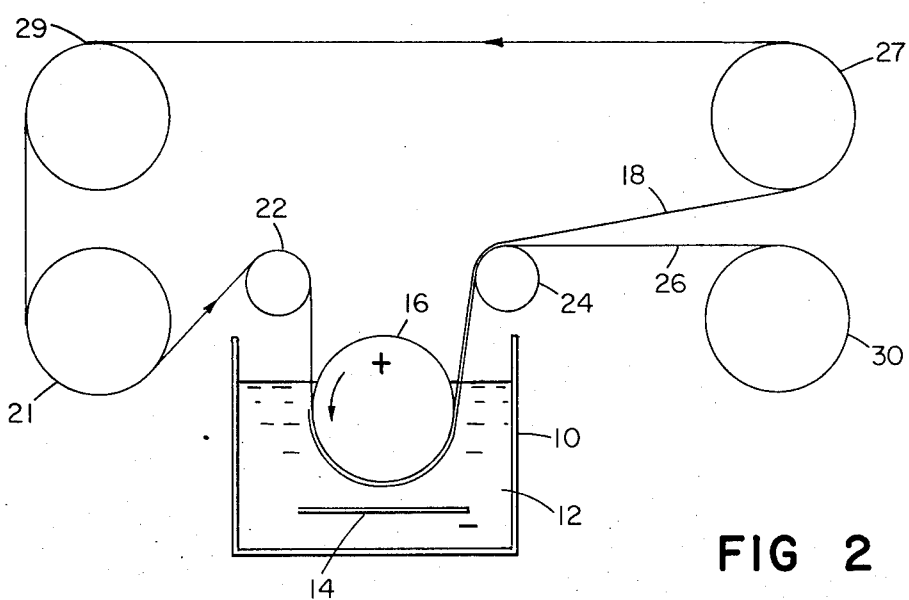
FIG. 2 is a modification of the apparatus of FIG. 1.
Figure 3:
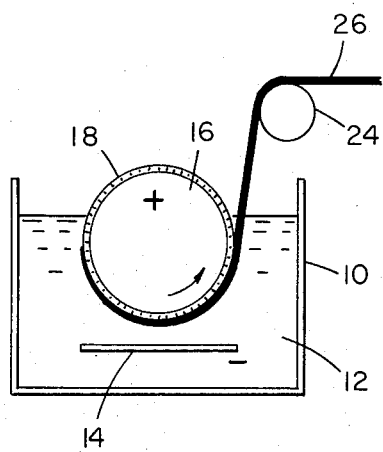
FIG. 3 is another modification of the process of this invention.

A simpler version of the processes shown in FIGS. 1 and 2 is shown in FIG. 3, where the barrier film 18, shown in exaggerated thickness, is in the form of a continuous sleeve or tube of water-sensitive cellophane or the like, slipped onto and in intimate contact with the anode 16. Deposition of the polymer particles on the barrier film leads to the formation of a coalesced polymer film 26, which may readily be stripped off the water-bearing barrier film.

Figure 4:
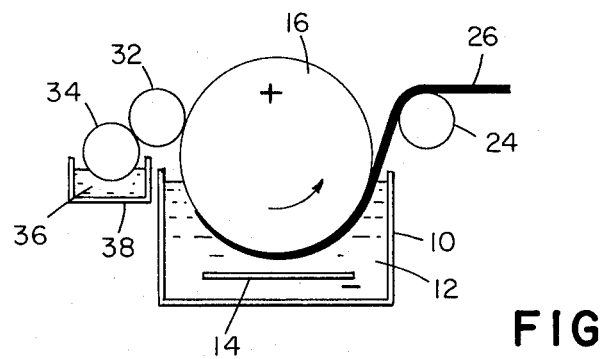
FIG. 4 is a modification of the process of FIG. 3.

As set forth above, although a water-absorbing but water-insoluble film is the barrier layer of choice, it is also possible to set up an aqueous barrier, preventing adhesive contact between the anode and the polymeric film, by wiping or coating onto the anode a thin film of viscous water dispersible material such as glycerine, aqueous solutions of polyvinyl alcohol, polyvinyl pyrollidone, polyacrylamide and the like. Such materials should preferably be non-ionic. Illustrative of such a process is the apparatus of FIG. 4, in which a thin layer of a viscous liquid 36, in a trough 38, is wiped onto the rotating anode 16 by means of the transfer rolls 32 and 34, which may be fabric-covered rolls such as are used in the lithographic industry for transferring a thin film of water or aqueous substance to sheet material.

The process of this invention is both versatile and economical, inasmuch as the current consumption is low in electrodeposition processes compared with the costs of conventional film formation. It is applicable to either negatively-charged or positively-charged polymers by reversing the polarity of the electrodes. The polymeric film may be dried and stored per se, or it may be combined with another substrate or superstrate as it is formed. As an illustration, a film of a tacky acrylic polymer formed by the process of this invention may be continuously superimposed on a fabric, paper, or film substrate, dried, and wound up to form a roll of pressure-sensitive adhesive tape.

In general, a wide variety of polymeric dispersions capable of electrodeposition may be used in the process of this invention to form substantially dry, self-sustaining films of low conductance. Typical dispersions, which are not intended to be limiting, are those in which the polymer comprises a monomer such as:

(1) Acrylic and methacrylic esters with from 1 to 28 carbon atoms, the average being 1 to 14 carbon atoms, in the alkyl ester group, such as methyl acrylate, ethyl acrylate, butyl acrylate, octyl acrylate, decyl methacrylate.

(2) Vinyl esters, wherein the acid radical contains at least 2 carbon atoms, such as vinyl acetate, vinyl propionate.

(3) Vinyl ethers where in the alkyl group has more than 1 carbon atom, such as butyl vinyl ether, octyl vinyl ether.

Useful dispersions are also made by the copolymerization of monomers of the above classes with monomers such as:

(4) Acrylic and methacrylic acids.
(5) Acrylamides, methacrylamides, and the N-substituted derivatives, such as N-methyl acrylamide, N-t-butyl acrylamide.
(6) Monomers containing —CN groups, such as acrylonitrile, cyanoethyl acrylate.
(7) Alkoxy-containing monomers, such as methoxyethyl acrylate, ethoxyethyl methacrylate, ethoxyethyl vinyl ether.
(8) Monomers derived from $\alpha,\beta$-unsaturated dicarboxylic acids, acid esters, and amic acids, such as maleic acid, butyl acid maleate, hexyl acid maleate, dodecyl maleamic acid, itaconamic acid, such as disclosed in U.S. Pat. 3,299,010.
(9) Allyl and methallyl monomers, such as allyl chloride, allyl acetate, methallyl alcohol.
(10) Vinyl monomers containing reactive groups, such as N-methylol methacrylamide, N-methoxymethyl acrylate, hydroxyethyl methacrylate, glycidyl acrylate.
(11) Monomers containing two or more vinyl groups, such as allyl acrylate, ethyleneglycol dimethacrylate, glyceryl trimethacrylate.

Where dispersions of the aforementioned polymers are not inherently capable of electrodeposition, they can be made so by conventional means, such as preparation in the presence of anionic or cationic surfactants.

Preferred in the process of this invention are dispersions which are inherently capable of electrodeposition, such as those disclosed in U.S. Pats. 2,643,254; 2,939,855; 3,483,153, and application U.S. Ser. No. 592,254, now U.S. Pat. No. 3,492,260.

EXAMPLE 1

A pressure-sensitive adhesive film was electrodeposited from an anionic dispersion prepared from a copolymer of 11.2 parts of ethyl acrylate, 82.8 parts of 2-ethylhexyl acrylate, 1.3 parts of ammonium hydroxide, and 4.7 parts of Primene maleamic acid, Primene being a Rohm and Haas trademark for a mixture of t-alkyl amines having highly branched alkyl groups in which the primary amino nitrogen atom is directly attached to a tertiary carbon atom. The aqueous dispersion, diluted to 10% solids, was placed in a tank containing a rotatable aluminum anode five inches in diameter, covered with a cellulosic sausage casing as the water-bearing layer. The cathode was a sheet of aluminum bent to the radius of curvature of the anode and mounted beneath it.

By applying a voltage of between 25 and 125 volts D.C. to the system, it was found that films of polymer varying in thickness between 0.2 and 2.5 mils were produced continuously at a rate of 10 feet per minute, and that said films could be continuously removed from the upper surface of the anode and transferred to release paper, fabrics, or polyvinyl chloride or polyester films. The films of electrodeposited polymer contained between 10% and 15% water, and had an electrical conductance of between 1 and 2 micro mhos per square centimeter.

EXAMPLE 2

An anionic dispersion was formed from a copolymer prepared from 20 parts of ethyl acrylate, 73 parts of 2-ethylhexyl acrylate, 2 parts of glycidyl acrylate, 5 parts of Primene maleamic acid, the latter ingredient being 80% neutralized with $NH_4OH$. Using a 10% aqueous dispersion of the above polymer, Example 1 was repeated, using a 1.5 mil cellophane film coating on the anode. By the application of 80 volts D.C., and a current density of 3.6 amperes per square foot, a 1.0 mil thick film of polymer was deposited onto the cellophane at a rate of 0.5 feet per minute, and was continuously removed and wound up on itself. The water content of the film was about 10%, and the electrical conductance was about 1 micro mho per square centimeter.

EXAMPLE 3

An anionic dispersion was formed from a copolymer prepared from 65 parts of ethyl acrylate, 25 parts of vinyl acetate, and 10 parts of Primene maleamic acid, the latter ingredient being 80% neutralized with $NH_4OH$. With no coating on the anode, the application of a D.C. voltage under conditions similar to Example 1 resulted in the deposition of the anode of a tenacious polymer film which could be removed only in fragments.

However, when the anode was coated with a thin layer of polyvinyl alcohol, the electrodeposited film was easily removed from the anode in a continuous, self-sustaining strip. In water content and conductance it was essentially similar to the films of Examples 1 and 2.

Having thus described my invention, I claim:

1. The method of continuously casting from and removing from an aqueous polymeric suspension a polymeric film of a water content of less than 20% and an electrical conductivity of less than 10 micro mhos per square centimeter by an electrodeposition process which comprises causing charged polymeric particles in aqueous suspension to migrate toward a rotating electrically-charged electrode by means of applying to said aqueous suspension an electrical charge opposite to the charge borne by said rotating electrode, while maintaining on said rotating electrode a continuously moving water-swellable but water-insoluble film layer which prevents the adhesive deposition of said polymeric particles on said electrode, continuously discharging the charge on the polymeric particles to form a unitary, self-sustaining polymeric film upon said water-swellable film layer, and continuously removing the substantially dry polymeric film from said water-swellable film layer in the form of a continuous sheet.

2. The method according to claim 1 in which the water-swellable barrier layer is a film of cellophane.

3. The method according to claim 1 in which the rotating electrode is an anode.

4. The method according to claim 1 in which the polymeric film is a film of pressure-sensitive adhesive.

References Cited
UNITED STATES PATENTS

| | | | |
|---|---|---|---|
| 2,898,279 | 8/1959 | Metcalfe et al. | 204—181 |
| 3,449,230 | 6/1969 | Heron et al. | 204—181 |
| 3,462,286 | 8/1969 | Geest et al. | 204—181 |

HOWARD S. WILLIAMS, Primary Examiner